No. 692,870. Patented Feb. 11, 1902.
H. LEMP.
CONTROLLER FOR AUTOMOBILE VEHICLES.
(Application filed Nov. 9, 1898.)
(No Model.) 3 Sheets—Sheet 1.

WITNESSES.
Edw. Williams Jr.
A. F. Macdonald.

INVENTOR.
Hermann Lemp,
by Albert G. Davis,
Atty.

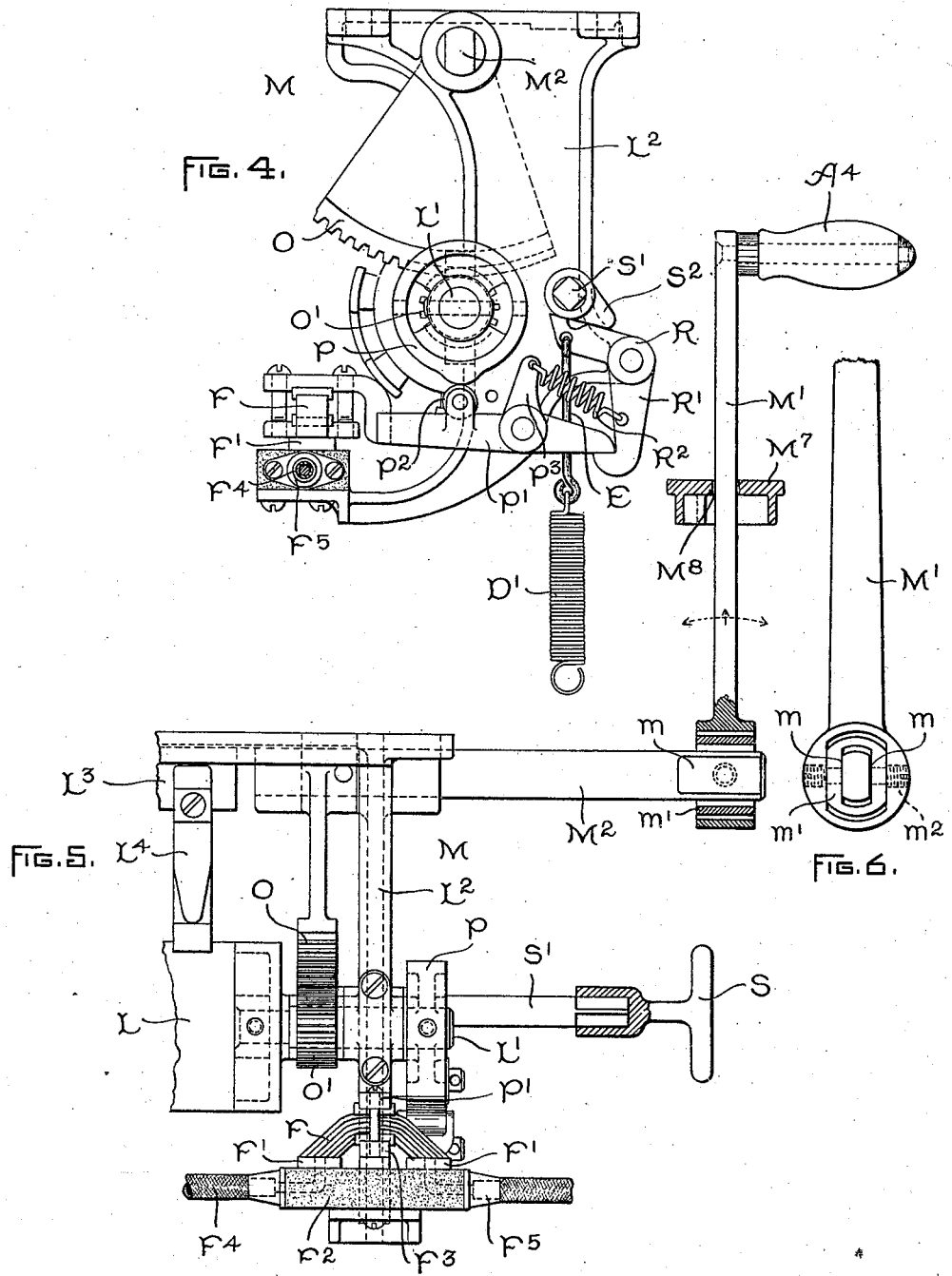

No. 692,870. Patented Feb. 11, 1902.
H. LEMP.
CONTROLLER FOR AUTOMOBILE VEHICLES.
(Application filed Nov. 9, 1898.)
(No Model.) 3 Sheets—Sheet 3.
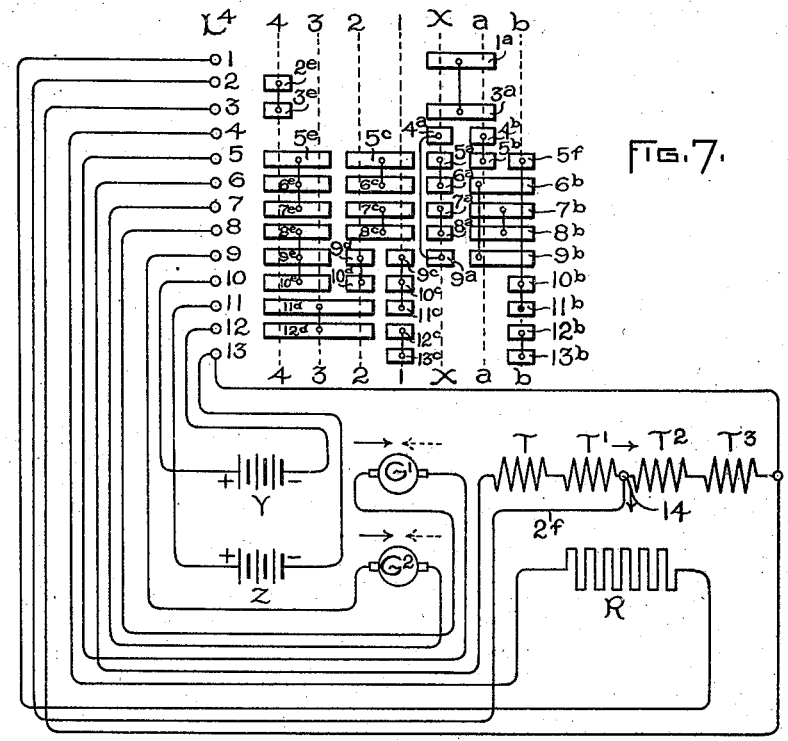
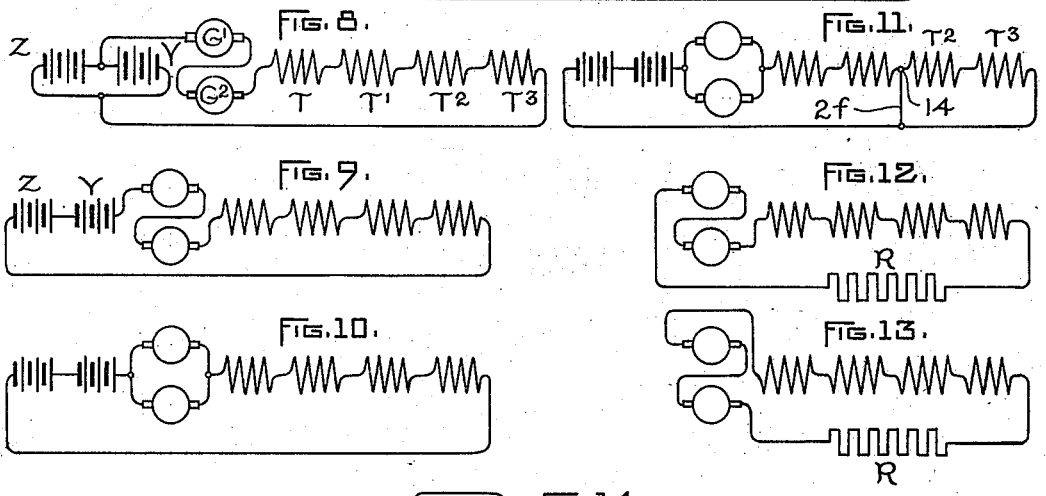
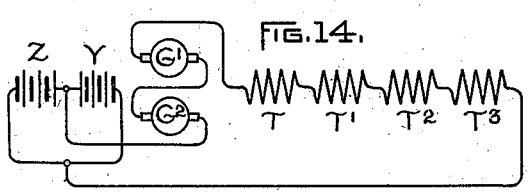
WITNESSES
Edw. Williams Jr.
A. F. Macdonald.
INVENTOR
Hermann Lemp.
By Albert G. Davis
Atty.
THE NORRIS PETERS CO., PHOTO-LITHO., WASHINGTON, D. C.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

CONTROLLER FOR AUTOMOBILE VEHICLES.

SPECIFICATION forming part of Letters Patent No. 692,870, dated February 11, 1902.

Application filed November 9, 1898. Serial No. 695,942. (No model.)

*To all whom it may concern:*

Be it known that I, HERMANN LEMP, a citizen of the United States, residing at Lynn, in the county of Essex, State of Massachusetts, have invented certain new and useful Improvements in Controllers for Automobile Vehicles, (Case No. 848,) of which the following is a specification.

My invention relates to the control of automobile vehicles, and particularly to that class which are propelled electrically by means of a storage battery or other source of power, though in some of its aspects it is not limited thereto.

It is of the utmost importance to make the control of any automobile vehicle such that no matter what conditions and emergencies may confront the person in charge he can quickly and without mistake apply a remedy.

My invention has for one of its objects to provide a system of control for an automobile vehicle which will meet the requirements mentioned above and this with practically no thought on the part of the operator.

My invention further has for its object to provide a controller for electrically-propelled vehicles which is capable of controlling the speed of the vehicle both when traveling in a forward or backward direction and also when it is desired to brake the vehicle by converting the propelling-motors into generators; and to these ends my invention consists in the parts and combination of parts, as hereinafter described, and set forth in the claims.

Figure 1:
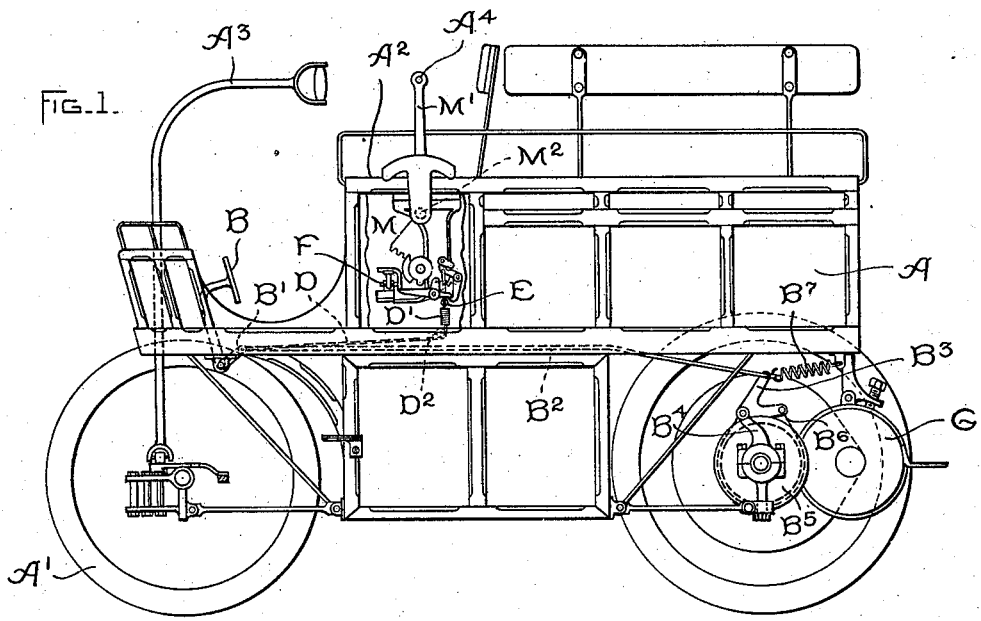
Figure 2:
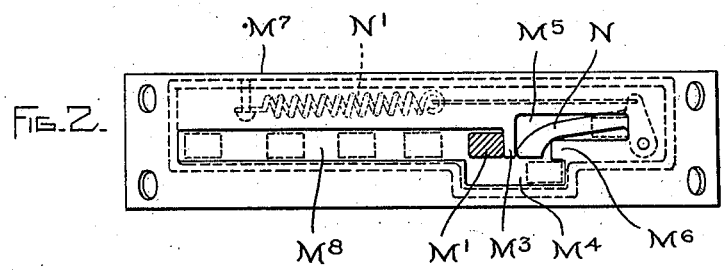
Figure 3:
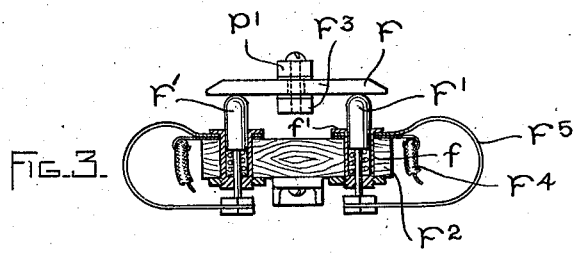

In the accompanying drawings, which illustrate an embodiment of my invention, Figure 1 is a side elevation of an automobile vehicle. Fig. 2 is a plan view of the guide for the controller-handle. Fig. 3 is a detail view showing a modification of the circuit-breaker. Fig. 4 is an end view of the controller. Fig. 5 is a partial side view of the same. Fig. 6 is a partial front elevation of the operating-handle. Fig. 7 is a diagram of the circuit connections of the controller; and Figs. 8 to 14, inclusive, are diagrams illustrating the motor combinations.

In vehicles operated by storage batteries it is very important to economize the energy of the battery, and for this reason I prefer to arrange the parts in such a manner that it is impossible to apply the brakes, either mechanical or electric, without first throwing off the power. Since it is not economical to start an electric carriage at a high acceleration, I arrange the circuit combinations of the batteries and motors in such a manner that the speed of the vehicle can be increased in a smooth and gradual manner. This is accomplished by advancing the controller in a step-by-step manner, the time intervals between steps being sufficient for the vehicle to attain the speed intended for each particular step before going to the next.

In vehicles employing a storage battery for propelling purposes it is very injurious to reverse the motor or motors while the vehicle is still moving, since current from the battery flowing through the motor or motors under these conditions is very heavy, as it is not limited by any intermediate resistance, such as would be found in motors operated from a trolley-circuit. When the battery discharges under the above conditions, the current will sometimes rise to several hundred amperes, and the consequence of suddenly reversing the vehicle and supplying such a heavy current to the motor may result in wrecking the vehicle or breaking the propelling-gears.

Having explained some of the principal difficulties encountered in the successful control of the storage-battery-propelled vehicle and in a general way the means employed to overcome them, I will now proceed to describe in detail the controller and the various parts of the vehicle whereby the control is rendered simple and efficient.

In Fig. 1 is shown a vehicle of any suitable construction having wheels A', which are preferably rubber-tired. In the front is a seat A² for the operator. The steering-handle A³ is located in the center of the vehicle in front of the seat and the controller-handle A⁴ on the left-hand side of the seat, so that the operator makes use of the right hand for steering and the left hand for controlling the speed.

Pivoted at a point under the vehicle and extending upward into the operator's compartment is a brake-lever B, which is designed to be operated by the foot. Connected to the lever is an arm B', and extending between this arm and an arm B³, mounted on a bracket B⁴ on the rear end of the vehicle, is a flexible connector B², as a wire rope, for example. Carried by the rear axle of the vehicle is a hub B⁵, and mounted on the bracket for engagement with the hub is a band-brake B⁶ of any suitable construction. When the connector B² is moved in the direction of the arrow by depressing the foot-lever B, the band-brake is applied, the spring B⁷ acting to release the brake as soon as the pressure is removed from the lever B.

In addition to actuating the band-brake the lever B is arranged to interrupt the circuit between the motor or motors G and the source of power, so that it is impossible to apply the mechanical brake and supply current to the motor at one and the same time. This is accomplished by means of the flexible connector D, which is secured at one end to the arm B' and at the other end to the hook E of the circuit-breaker F. The connector is passed around the pulley D² and is connected to the hook through a spring D'. This arrangement permits the movement of the arm B' over a wide range. For example, the first portion of the forward movement of the arm B will trip the breaker, and the balance of the movement will merely extend the spring D'. The construction and arrangement of the circuit-breaker will be more fully described hereinafter.

Geared to the rear wheels of the vehicle and supported in any suitable manner is an electric motor G, which in the present instance is provided with two armature-windings connected to separate commutators. This being a well-known construction, it is not necessary to illustrate it in detail.

Mounted on the left-hand side of the vehicle under the seat is a controller M, arranged to have a certain number of running positions forward—in the present instance four shown—one of rest, and a single backward running position, since it is not intended that the vehicle shall travel backward at other than its slowest speed. In addition to this two braking positions are provided—one for use when the vehicle is running forward, the other for use when it is running backward. The backward-running brake position corresponds to the position of rest for the forward position, as will be more fully described in connection with the diagrammatic figures of the drawings.

The actuating-handle M' of the controller is secured to the operating-shaft M² by a loose connection which permits the handle to move freely in a lateral direction, as indicated by the dotted arrows in Fig. 5, to enable it to pass certain of the stops in the guide-plate M⁷. The outer end of the shaft is provided with two flat surfaces m, and mounted on this portion of the shaft is a collar m', capable of a slight vertical movement independent of the shaft; but the arrangement is such that rotary movement of the one independent of the other is prevented. Surrounding the collar and secured thereto by the screws m² is the enlarged head or hub of the handle M'. Under ordinary conditions—that is, in starting, stopping, and controlling the vehicle when moving in a forward direction—the handle M' moves back and forth in the slot M⁸, Fig. 2, the stop M³ limiting its backward movement; but when it is desired to apply the electric brakes the handle is moved back to the stop M³, then given a slight outward movement to the left when considered from the position of operation, which takes it out of the path of the stop, and the backward movement is continued in the slot-section M⁴ until the handle rests in the back end of the slot, the stop M⁶ preventing it from entering the slot M⁵. If it is desired to reverse, the handle is moved out and around the stop M³ and into the slot-section M⁵. This latter movement is opposed by the pivoted dog N, which is normally held in the position shown by the spiral extension-spring N', (shown in dotted lines.) This motion, while exceedingly simple to carry out when intentional, is sufficiently complicated to prevent accidental reversing in time of an emergency. With this arrangement it is impossible by means of a single backward stroke to reverse the propelling motor or motors, and it requires a slight outward movement of the handle in order to apply the brake, so that there is no danger of applying the brake or reversing inadvertently.

If it is necessary to make a rapid stop, the controller may be moved into the braking position at once by pushing the handle slightly outward, at the same time pulling it backward. It is very important, however, that under no consideration should the lever be allowed to go farther than into the braking position unless the carriage has come to a full stop.

Referring more particularly to Figs. 4 and 5, the contacts which change the motor and battery combinations are mounted on a cylinder L, having a supporting-shaft L'. This shaft is mounted in suitable bearings formed on the cast-metal base L². Mounted on the base is a strip of insulating material L³, forming a support for the horizontal row of brushes L⁴. A reciprocating motion is transmitted from the actuating-shaft M² to the cylinder by means of a sector O and a gear O', the latter being rigidly secured to the shaft L' of the cylinder. By means of this gearing the travel of the handle M' with respect to the controller-cylinder can be made anything that is desired.

Secured to the outer end of the shaft L' is a cam P, arranged to insure the closing of the circuit-breaker F each time that it is moved to the position shown. This cam acts through the roller P² on the lever P', so that when the cam is in the position shown the lever is forced downward to close the circuit between the contacts F' F' through the brush F. These stationary contacts F' are mounted on a body of insulating material F², which is supported by an extension of the base L². The brush F consists of a bundle of copper strips secured between the lever P' and the clamp F³. The circuit-breaker is connected in the main circuit and current is carried to and from it by means of the wires F⁴, which are mounted in sockets F⁵.

Pivotally supported on the base of the controller is a locking device R, consisting of a bell-crank lever having a latch R' for holding the lever P' in the position shown and the circuit-breaker closed. Between an upwardly-extending arm P³ on the lever and the latch R' is an extension-spring R², arranged to hold the latch in the position shown. A shaft S' projects outward to some accessible part of the vehicle, and mounted on the shaft is a dog S², arranged to engage with the upper arm of the bell-crank lever of the locking device R when forced in a clockwise direction and release the lever P' from the latch R', and as soon as the main operating-handle M' is moved from the off position the spring R² serves to open the circuit-breaker. It will be seen that the spring R' serves not only to hold the latch in position, but also open the circuit when the latch R' is moved out of engagement with the lever P'. The operating handle S being small may be removed and carried in the pocket at such times as it is not in use, thus rendering it impossible for unauthorized persons to operate the vehicle. By this arrangement the parts are retained in a partially-operative position, and as soon as the dog S² is moved to the position shown the lever P' is again locked; but if the operating-handle is moved while the latch R' is disengaged from the lever the circuit-breaker opens, and it is necessary to return the handle to its off position in order to close the circuit and permit the latch to engage with the end of the lever. This obviates all danger of the vehicle starting before the operator is in his seat.

To prevent the battery from supplying current to the motor at the time the mechanical brake is being applied, a hook or rod E is employed, connected on one end to the latch R and at the other end to the spring D', as explained above in connection with Fig. 1. By this arrangement the circuit is automatically interrupted at the circuit-breaker as soon as the brake is applied, and this irrespective of the position which the controller-handle occupies. This is a particularly desirable arrangement, for no matter how little skill an operator has in time of danger he will instinctively apply the brake and the motor will stop. Moreover, as the circuit-breaker can only be set by means of the cam P it is necessary before starting again to return the controller-cylinder to the off position, which is the only position where it will set the breaker, thereby preventing a sudden forward movement of the vehicle, which would occur after the brakes were released if the circuit were not interrupted. The arrangement shown also obliges the operator to turn on the current gradually from the slowest to the fastest speeds, and thereby protects both the batteries and apparatus from sudden shocks.

In Fig. 3 is shown a slight modification of the circuit-breaker in which a flat contact-bar F is carried by the pivoted lever P' and is held in place by the clamp F³. Mounted in the insulating-support F² are two spring-pressed contacts F'. These contacts are arranged to move vertically within the metal sleeve $f$, which is provided with a head that engages with the under side of the insulating-support. On the upper end of the tube is a head $f'$, and located under the head is a curved strip of good conducting material F⁵, which is connected on the lower end to the contact F' and conveys current to and from the cable F⁴.

Referring now to Figs. 7 to 14, inclusive, the circuits will be described. The contacts on the controller-cylinder are shown developed on the plane of the paper, and in the off position, or position of rest, the vertical row of brushes L⁴ rest on the line X X; but for clearness of illustration the brushes are shown at the left of the contacts. The armature of the motor has two separate windings G' and G², and the windings are treated as though they were separate armatures and their circuit connections changed from series to parallel relation. Four field-coils T, T', T², and T³ are used for energizing the motor, and the connections are so arranged that either two or four of the field-coils may be used—as, for example, I may start with the four coils in circuit and later cut out two of the coils to increase the speed of the motor. If desired, this change may be made when the armatures are working in series or in parallel relation. The tracing of these circuits will be somewhat simplified if it is borne in mind that the parts which are connected electrically are given the same reference-figure, but with different exponents—as, for example, the brush 5 is arranged to make contact with the contacts 5ª, 5ᵇ, &c. With the controller at the off position, or position of rest, the brushes will rest on the line X X and the circuit is as follows: from brush 1 to the resistance R, to the brush 4, contact 4ª, thence by cross connection to the contact 9ª, to brush 9, to armature-winding G², to brush 7, to contact 7ª, by cross connection to contact 8ª, to brush 8, to armature-winding G', to brush 5, to contact 5ª, by cross connection to the contact 6ª, to brush 6, through the field-coils T, T', T², and T³ to the brush 3, to the contact 3ª, by cross connection to contact 1ª, to brush 1, the point of starting. With the circuits arranged as described the armatures, field-coils, and resistance are coupled as shown in Fig. 12, the two armatures being included in a local circuit with the resistance R.

In the event of the vehicle being propelled up a grade and the power giving out, so that the vehicle tends to run backward, the arrangement above described forms an important feature, for by bringing the handle to the off position the motor will act as a generator and retard the vehicle to a point where it will be entirely under the control of the mechanical foot-brake.

When it is desired to propel the vehicle forward, the contacts are moved to a point where the brushes rest on line 1 1, and the circuit will be as follows: Current flows from the positive side of the battery Y to the brush 10, and current flows from the positive side of the battery Z to the brush 11. These two brushes rest, respectively, upon the cross-connected contacts $10^c$ and $11^c$, which contacts are cross-connected to contact $9^c$. From contact $9^c$ their circuit is to brush 9, through the armature-winding $G^2$, to brush 7, to contact $7^c$, by cross connection to contact $8^c$, to brush 8, through the armature-winding $G'$, to the brush 5, to contact $5^c$, by cross connection to contact $6^c$, to brush 6, through the field-coils T T' $T^2$ $T^3$, to brush 13, where the circuit divides, one circuit returning directly to the negative side of the battery Z and the second circuit being to contact $13^c$, by cross connection to contact $12^c$, to brush 12, and to the negative side of the battery Y. With the circuits arranged as described the armatures and fields are connected as shown in Fig. 8—that is, with the two batteries connected in multiple and the armatures and field-coils in series. It will be noted in connection with this system of control that the only time the resistance R is employed is when the motor is acting as a generator to retard the progress of the vehicle.

When it is desired to increase the speed of the vehicle, the contacts are advanced by means of the controller-handle M' to a point where the brushes rest upon the line 2 2, and the circuit is as follows: from the positive side of battery Y to the brush 10, to contact $10^d$, by cross connection to contact $9^d$, to brush 9, through the armature-winding $G^2$, to brush 7, to contact $7^c$, by cross connection to contact $8^c$, to brush 8, to the armature-winding $G'$, to the brush 5, to contact $5^c$, by cross connection to contact $6^c$, to brush 6, through the field-coils T T' $T^2$ $T^3$ to the brush 13, thence through the battery Z to brush 11, to contact $11^d$, by cross connection to contact $12^d$, to brush 12, through the battery Y to the point of starting. With the circuits arranged as above described the batteries Y and Z are connected in series, as shown in Fig. 9, with the two armature-coils and the four field-coils also in series. To further increase the speed of the vehicle, the cylinder is moved to a point where the brushes rest on the line 3 3, and the circuit is as follows: from the positive side of the battery Y to brush 10, to contact $10^c$, by cross connection to contact $9^c$, where the circuit divides, one part being to brush 9, to the armature-winding $G^2$, to brush 7, to contact $7^c$, by cross connection to contact $6^c$. Starting at the point of division, (the contact $9^c$,) the second circuit is to contact $8^c$, by cross connection to brush 8, through the armature-winding $G'$ to the brush 5, to contact $5^c$, by cross connection to contact $6^c$, where it unites with the first-named circuit, to brush 6, through the field-coils T T' $T^2$ $T^3$ to the brush 13, through the battery Z to the brush 11, contact $11^d$, by cross connection to contact $12^d$, to brush 12, through the battery Y to the point of starting. With the circuits arranged as above described the armatures and batteries are coupled as shown in Fig. 10—that is, with the batteries in series, the armatures in multiple, and all of the field-coils in series. To further increase the speed of the vehicle, the contacts are advanced to a point where the brushes rest on the line 4 4, and the circuit is as follows: from the positive side of the battery Y to the brush 10, to the contact $10^e$, by cross connection to contact $9^e$, where the circuit divides, one path being to brush 9, to armature $G^2$, to brush 7, to contact $7^e$, by cross connection to contact $6^e$. Returning to the point where the circuit first divided, the second circuit is from contact $9^e$ to contact $8^e$, by cross connection to brush 8, to armature-winding $G'$, to brush 5, to contact $5^e$, to contact $6^e$ by cross connection, where the circuit unites with the first-named circuit, to brush 6, through the field-coils T T', to the brush 2, to contact $2^c$, to brush 3, to the brush 13, through the battery Z, to the brush 11, to contact $11^d$, by cross connection to contact $12^d$, to brush 12, through the battery Y, to the point of starting. In addition to the circuits above described there is in this position a circuit from the point 14, between the field-coils T' and $T^2$, through coils T and $T^3$, to brush 13. These field-coils, however, are shunted by the low-resistance connection through the brushes 2 and 3 on the controller. With the circuits arranged as above described the armatures and batteries and field-coils are connected as shown in Fig. 11—that is, with the two batteries in series and the two armatures in multiple and connected to two field-coils in series, the coils $T^2$ and $T^3$ being shunted by the loop $2^f$.

Assuming that it is desired to brake the vehicle electrically, the contacts on the cylinder are moved to a point where the brushes $L^4$ rest on the line $a\ a$, and the circuit is as follows: from brush 1 through the resistance R to brush 4, contact $4^b$, by cross connection to contact $5^b$, to brush 5, through the armature-winding $G'$ in the direction indicated by the dotted arrow to brush 8, to contact $8^b$, by cross connection to contact $7^b$, to brush 7, through the armature-winding $G^2$ in the direction indicated by the dotted arrow to brush 9, to contact $9^b$, by cross connection to contact $6^b$, to brush 6, through the field-coils T T' $T^2$ $T^3$ to brush 3, to contact $3^a$, by cross connection to contact $1^a$, to brush 1, the point of starting. With the circuits arranged as described the armature-windings are connected in series with the field-coils and the resistance R. It will be observed that the current flows through the armatures in the opposite direction to that in which it flowed when they were connected as shown in Fig 12.

When it is desired to propel the vehicle backward, the controller-handle M' is moved past the stops $M^3$ and $M^6$ into the slot $M^5$ and moved backward until it occupies the position shown in dotted lines in Fig. 2. When the handle has been moved to this point, the brushes $L^4$ will rest on the line $b\ b$, and the circuit is as follows: from the positive side of battery Y to brush 10, to contact $10^b$. A second circuit is from the positive side of the battery Z to brush 11, to contact $11^b$, by cross connection to contact $10^b$, where it unites with the first-named circuit. The circuit from this point is by cross connection to contact $5^f$, to brush 5, through the armature-winding G' in the direction indicated by the dotted arrow to the brush 8, to contact $8^b$, by cross connection to contact $7^b$, to brush 7, through the armature-winding $G^2$ in the direction indicated by the dotted arrow to the brush 9, to contact $9^b$, by cross connection to contact $6^b$, to brush 6, through the field-coils T T' $T^2$ $T^3$ to brush 13, where the circuit divides, one path being directly to the negative side of the battery Z and the other circuit to contact $13^b$, by cross connection to contact $12^b$, to the negative side of battery Y. With the circuits arranged as described above the armatures are connected in series with the field-coils and the batteries are connected in multiple and are supplying current to the circuit.

It will be seen that only one backward speed has been provided, while four forward speeds are provided. I prefer to limit the speed at which the vehicle can be propelled backward in order to avoid accidents which might occur if the vehicle were allowed to proceed at a high speed in this direction, and, furthermore, it is not necessary to run the vehicle backward for any length of time, and therefore more than one speed is unnecessary.

By examining Fig. 2 in connection with Fig. 7 it will be seen that the handle M' moves in one plane—i. e., in the slot-section $M^3$—when it establishes one set of circuit connections, in a second plane—i. e., in slot-section $M^4$—when it establishes a second set of circuit connections, and in a third plane— i. e., in slot-section $M^5$—when it establishes the third set of circuit connections. The first and third planes of movement are not exactly coincident, but could be made so, if desired.

If it so happens that the vehicle is advancing more or less rapidly and it is desired to stop suddenly, the foot or mechanical brake is applied, which first opens the circuit between the motor and the battery and then retards the vehicle. If further braking effect is desired, the operating-handle may be moved to the brake position, and the generator effect of the motor-windings is added to that of the foot or mechanical brake. As the controlling-cylinder passes through the off position it will momentarily close the circuit-breaker; but the instant the high point on the cam P passes off the roller it will again open under the action of spring $R^2$. By this arrangement it will be seen that the second set or braking-contacts may be operated at a time when the first or propelling set of contacts is inoperative, due to the opening of the main circuit by the circuit-breaker.

What I claim as new, and desire to secure by Letters Patent of the United States, is—

1. The combination with a vehicle, of a source of supply, a separate means for cutting off the supply of energy from the motor when the brake is applied, a mechanical brake, and a yielding connection between the mechanical brake and the said means, whereby the movements of the brake and the said means may be dissimilar.

2. In an automobile vehicle, the combination of a motor, a source of electrical energy, a mechanical brake arranged to operate on one of the wheels, a brake-lever arranged to be operated by the foot, a connection between the lever and the brake, a controller for regulating the speed of the motor in a step-by-step manner, and a circuit-breaker so constructed and arranged as to cut the controller out of circuit irrespective of its position, and means for actuating the circuit-breaker whenever the mechanical brake is applied, irrespective of the position of the controller.

3. In a controller, the combination of moving and stationary contacts for changing the motor-circuits, and a handle for actuating the moving contacts arranged to have movement in a definite fixed path passing into a plurality of planes, movement in said different planes being arranged to establish different circuit connections.

4. In a controller, the combination of moving and stationary contacts for changing the motor-circuits, and a handle for actuating the moving contacts arranged to have three planes of movement, the first of said movements acting to control the motor-circuits to give a forward rotation, the second to establish the brake-circuits and retard the vehicle, and the third to connect the circuits in such manner as to give a backward rotation.

5. The combination with a controller, adapted by its continuous rotation to carry on the control of an electric motor in either direction, of an operating-handle actuating said controller, and a fixed plate guiding the handle into different planes during its consecutive movement.

6. The combination with a controller, of contacts thereon, and other contacts coöperating therewith, whereby the movement of the controller will operate to control electric-motor circuits, of an operating-handle therefor, and a retarding device for preventing too-rapid operation of the controller, the same consisting of a slotted plate constraining the handle to follow a predetermined path and to pass from one plane to another between steps.

7. In a controller for an electric motor, the combination of contacts for establishing a forward rotation of the motor-armature and controlling the speed of the motor in a step-by-step manner while so connected, contacts for including the motor in a closed circuit when the controller is at the off position, and contacts situated back of the off position and forming a single step in the controller, which establish the proper connections to cause the motor-amature to revolve in a backward direction.

8. In a controller for automobile vehicles, the combination of a source of power divided into units, a dynamo-electric machine, means for coupling the units in various orders to vary the electromotive force supplied to the said machine, thereby doing away with the necessity for any external resistance, contacts for including the dynamo-electric machine on a local circuit together with a resistance which acts as a load therefor, and contacts for coupling the machine in circuit with the source of power without any resistance in a manner to cause a backward rotation of the armature of the machine.

9. In a system of control, the combination of a storage battery divided into units, contacts for coupling the units in series or parallel to change the electromotive force supplied to the load-circuit, thereby avoiding the use of an external resistance, and means for disconnecting the source of supply from the load-circuit and including the load on a local circuit with an external resistance.

10. In an electric controller, the combination of a handle, and a slotted guide-plate in which the handle travels, having an offset formed in the slot, whereby the free passage of the handle is checked and it becomes necessary to move the handle laterally in passing from one end of the slot to the other.

11. In an electric controller, the combination of a handle, a slotted plate in which the handle moves, the slot being provided with an offset to prevent a quick movement of the handle from one end of the slot to the other, and means permitting the handle to follow the slot if actuated in a gradual manner.

12. The combination with a controller of an actuating-handle mechanically connected thereto, and a slotted guide-plate in which the said handle is adapted to travel, whereby a bodily movement of the handle in a plane at an angle to its normal plane of movement is required, and a definite check interposed, at the desired point or points.

13. The combination with a controller of an actuating-handle mechanically connected thereto, and a slotted fixed guide-plate in which the said handle is adapted to travel, whereby a bodily movement of the handle in a plane at an angle to its normal plane of movement is required, and a definite check interposed, at the desired point or points.

14. In a controller, the combination of a slotted guide-plate having an offset in the slot, an oscillating handle arranged to work in said plate, and a spring-controlled means for closing the offset.

15. In a controller, the combination of a fixed guide-plate having a slot-section, with a second slot-section communicating with the first, and a third section out of line with the second section, but communicating therewith, but not with the first section, and a handle arranged to operate the controller and move in the slot-sections.

16. As an article of manufacture, the guide for a controller comprising a metal plate having a slot-section $M^3$, a slot-section $M^4$, and a slot-section $M^5$, the said slot-sections communicating with each other in the order named, substantially as described.

17. In a controller, the combination of a set of moving and a set of stationary contacts, an operating-handle for actuating said contacts whereby the movement of the handle will act to control electric-motor circuits, of a retarding device for preventing too-rapid operation of the controller, the same consisting of means for arresting the motion of the handle, and means whereby the actuation of the handle in a direction at an angle with its normal direction will allow it to be moved to cause the further operation of the controller in the direction in which it was proceeding before its motion was arrested.

18. In a controller, the combination of a set of moving contacts, a handle for moving the contacts arranged to move in two planes, means for normally restricting the movement of the handle to one plane of movement, a pivoted dog for opposing the handle in the second plane of movement, and a spring for actuating the dog.

19. In a controller, the combination of moving and stationary contacts, a circuit-breaker which under normal conditions is unaffected by the operation of the controller, or by the current flowing therethrough, and means for rendering the operation of the circuit-breaker dependent upon the action of the moving contacts.

20. The combination with a controller of a spring-actuated circuit-breaker in circuit therewith, mechanical means for opening said circuit-breaker at will, and means whereby the circuit-breaker is reset by the controller.

21. The combination with a controller of a circuit-breaker, mechanical means for opening said circuit-breaker at will, and means whereby the circuit-breaker is reset by the controller in the off position.

22. In a controller, the combination of a circuit-breaker, an actuator for the breaker, a shaft, a cam carried thereby and arranged to control the action of the actuator of the circuit-breaker, and a pivoted latch for holding the actuator under the normal operation of the controller.

23. In a controller, the combination of an actuating-handle mounted upon a suitable support, a detachable handle having nothing to do with the normal operation of the controller, and means controlled by the detachable handle for rendering the controller inoperative.

24. In a circuit-breaker, the combination of a spring-pressed contact, a metal tube in which the contact is mounted, a head for the tube, and a curved metal strip which is secured to the tube at one end and to the contact at the other.

25. In a circuit-breaker, the combination of a pivoted lever, a contact carried thereby, a latch for holding the lever in its closed position, means for releasing the latch, and a spring which normally holds the latch in engagement with the lever and also opens the contact when the lever is released.

26. In a system of control for automobile vehicles, the combination of a controller arranged to control the propelling-motor over its range of speed, a mechanical brake, and means controlled by the brake which require that the controller shall be returned to the off position after each application of the brake before the vehicle can be started.

27. In a system of control for electrically-propelled vehicles, the combination of a controller arranged to couple the motor in any desired relation with the source of energy and to regulate it when so connected, a brake having an operating means separate from that of the controller, and means so arranged that it is necessary to return the controller to the off position either before or after each application of the brake, in order to place the controller in operative relation with respect to the propelling-motor and source of energy.

28. A motor-controller arranged to connect the motor field and armature windings in series in a closed circuit when thrown to the off position, the connections being so made that the motor is prevented from running away under the influence of the backward force.

29. A controller for series motors arranged to short-circuit the motor field and armature windings, without reversing their relative connections, when thrown to the off position, whereby the motor is prevented from running away under the influence of a backward force.

30. The combination in an automobile vehicle, of a controlling device therefor and an additional part or handle, independent of the controlling device and having nothing to do with the normal control of the vehicle, adapted for ready removal, and means whereby the operation of said part renders the vehicle inoperative.

31. In a controller for electrically-propelled vehicles, the combination of a supply-circuit, contacts for controlling the vehicle during the forward movement, contacts for controlling the vehicle during the backward movement, a mechanical brake, and means entirely independent of the sets of contacts and controlled by the mechanical brake, for interrupting the supply-circuit irrespective of the position occupied by the sets of contacts.

32. In a controller for an electrically-propelled vehicle, the combination of a motor, contacts for controlling a motor during the forward movement, a mechanical brake, means actuated by the mechanical brake and independent of the contacts for interrupting a circuit, and a second set of contacts arranged to include the motor in a brake-circuit after the mechanical brake has been started into operation.

33. In a controller for electrically-propelled vehicles, the combination of a motor, contacts for regulating the motor during the forward movement, a mechanical brake, means actuated by the mechanical brake for rendering the regulating-contacts inoperative, and a second set of contacts for including the motor in a brake-circuit, the second set of contacts being so arranged that they may be rendered operative while the first set is inoperative.

34. In an electrically-propelled vehicle, the combination of an electrically-operated mechanism, contacts for connecting the mechanism for power purposes, contacts for connecting the mechanism for braking purposes, a mechanical brake for said mechanism, and means whereby the actuation of the mechanical brake will render the power-circuits inoperative without affecting the brake connections.

In witness whereof I have hereunto set my hand this 7th day of November, 1898.

HERMANN LEMP.

Witnesses:
ELIHU THOMSON,
DUGALD MCKILLOP.